United States Patent [19]

Suzuki et al.

[11] Patent Number: 5,453,991
[45] Date of Patent: Sep. 26, 1995

[54] INTEGRATED CIRCUIT DEVICE WITH INTERNAL INSPECTION CIRCUITRY

[75] Inventors: Kouhei Suzuki; Kouji Suzuki, both of Yokohama; Miki Mori, Kawasaki; Akinori Hongu, Fujisawa; Nobuo Iwase, Kamakura, all of Japan

[73] Assignee: Kabushiki Kaisha Toshiba, Kawasaki, Japan

[21] Appl. No.: 31,730

[22] Filed: Mar. 15, 1993

[30] Foreign Application Priority Data

Mar. 18, 1992 [JP] Japan ..................... 4-062120
Apr. 14, 1992 [JP] Japan ..................... 4-094275

[51] Int. Cl.⁶ ..................................... G06F 7/02
[52] U.S. Cl. .................. 371/22.1; 364/490; 364/481; 324/765; 324/770
[58] Field of Search ............... 371/22.1, 24, 25.1; 364/481, 489, 490; 324/527, 537, 765, 770

[56] References Cited

U.S. PATENT DOCUMENTS

| | | | |
|---|---|---|---|
| 4,703,483 | 10/1987 | Enomoto et al. | 371/22.1 |
| 4,910,735 | 3/1990 | Yamashita | 371/22.1 |
| 4,945,536 | 7/1990 | Hancu | 371/22.1 |
| 4,970,724 | 11/1990 | Yung | 371/22.1 |

FOREIGN PATENT DOCUMENTS

| | | |
|---|---|---|
| 1-134340 | 5/1989 | Japan . |
| 3-18891 | 1/1991 | Japan . |
| 3-142499 | 6/1991 | Japan . |

*Primary Examiner*—Ellis B. Ramirez
*Assistant Examiner*—Thomas Peeso
*Attorney, Agent, or Firm*—Oblon, Spivak, McClelland, Maier, & Neustadt

[57] ABSTRACT

A highly-integrated semiconductor IC device includes a semiconductive substrate, on which an internal function circuit is arranged to have a first plurality of input terminals and a second plurality of output terminals. A logic circuit is arranged on the substrate and is connected to the internal circuit through the output terminals. The logic circuit has a third plurality of output terminals, which are less in number than the outputs of the internal circuit. These logic output terminals are coupled to the same number of inspection terminals, which are adapted to be coupled to a known electric inspection tool. The logic circuit processes the voltage signals appearing at the output terminals of the internal circuit so as to cause these signals to decrease in number. The output signals of the logic circuit are sent to the inspection terminals as monitor signals, based on which an inspection is carried out to determine whether the internal circuit operates normally.

15 Claims, 10 Drawing Sheets

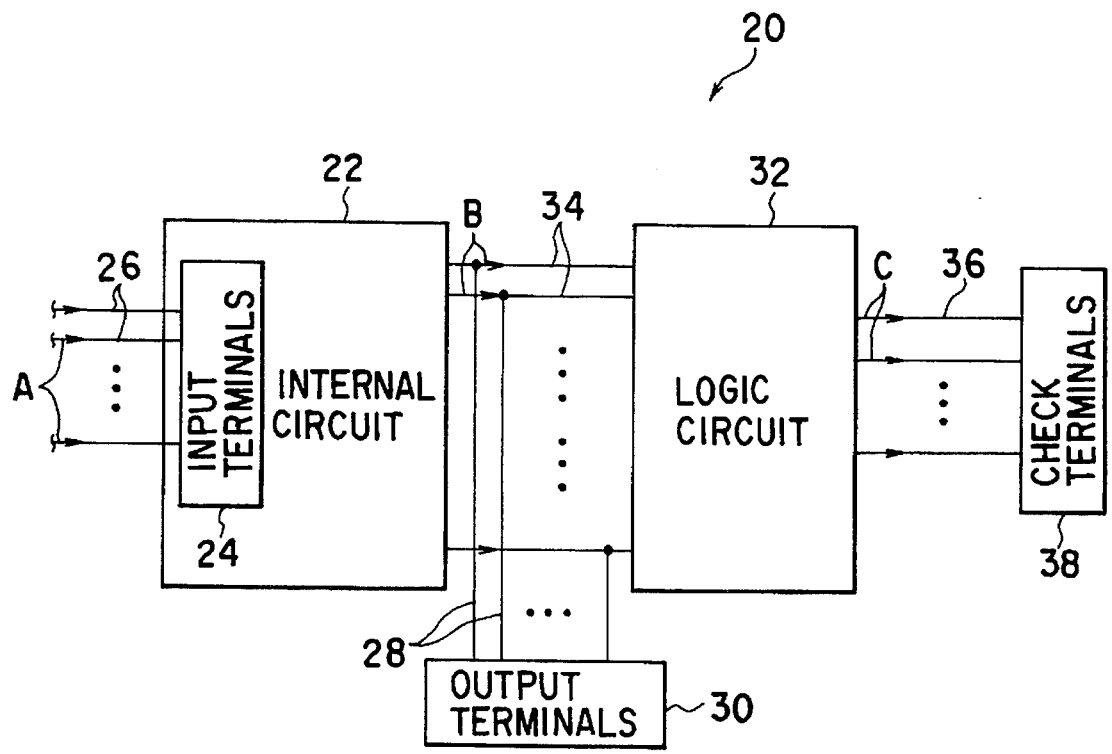
F I G. 1
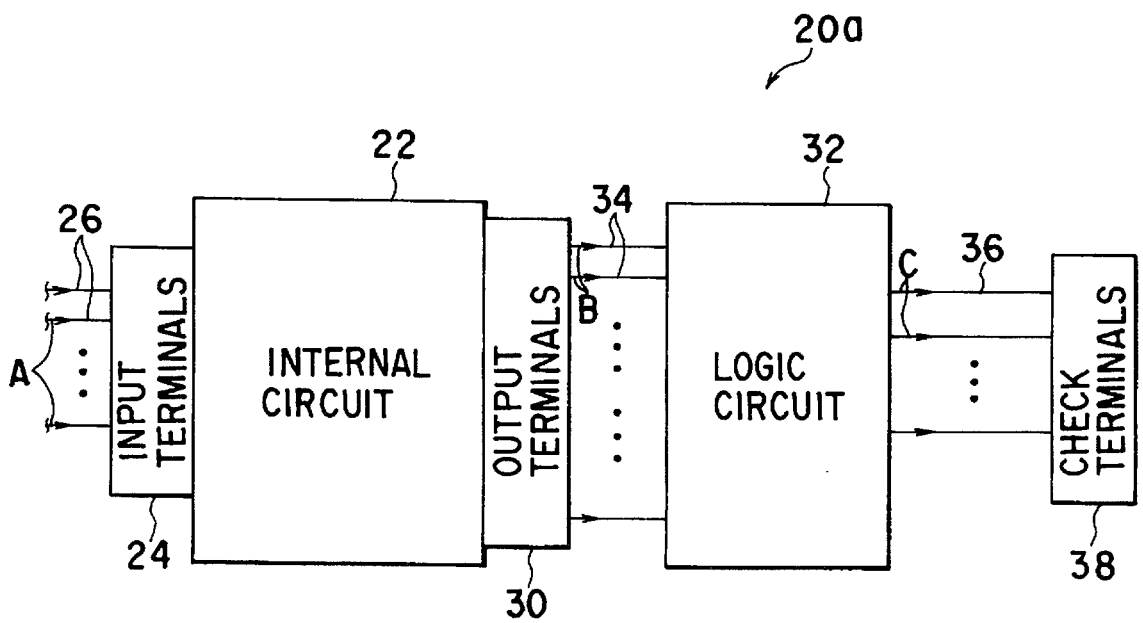
F I G. 2

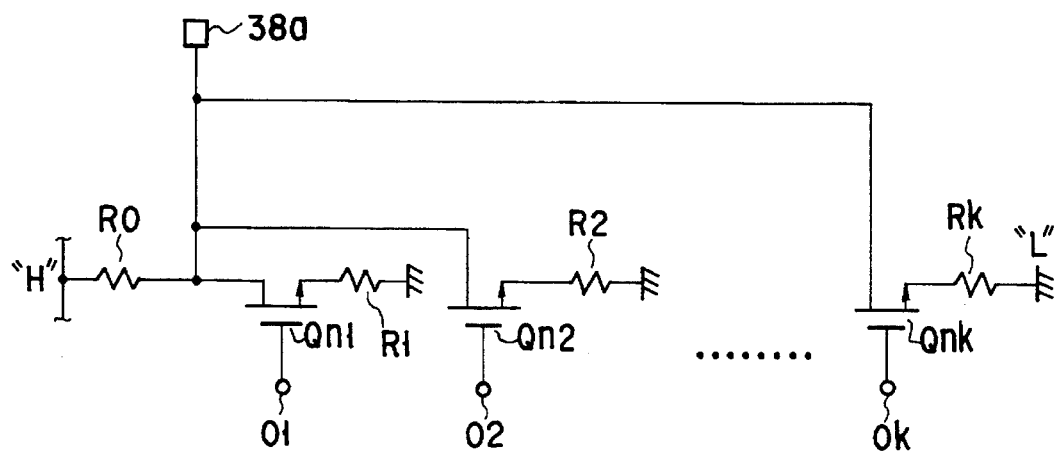
F I G. 3
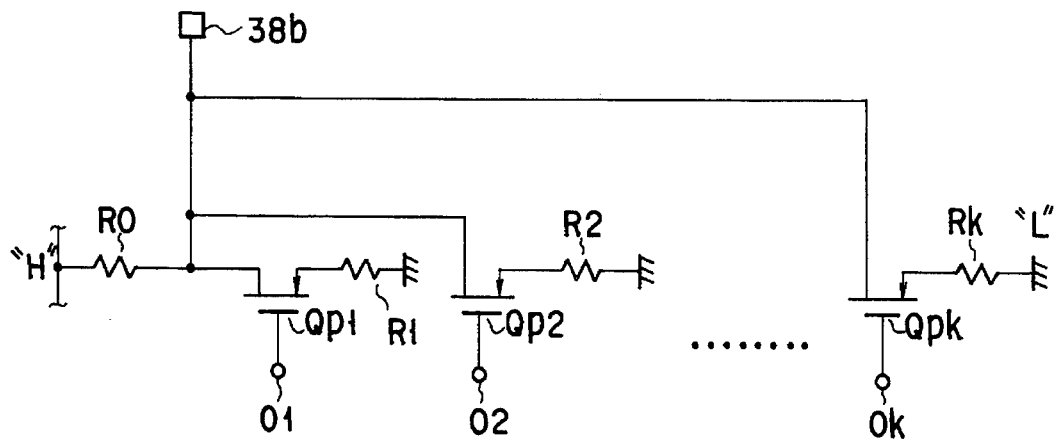
F I G. 4
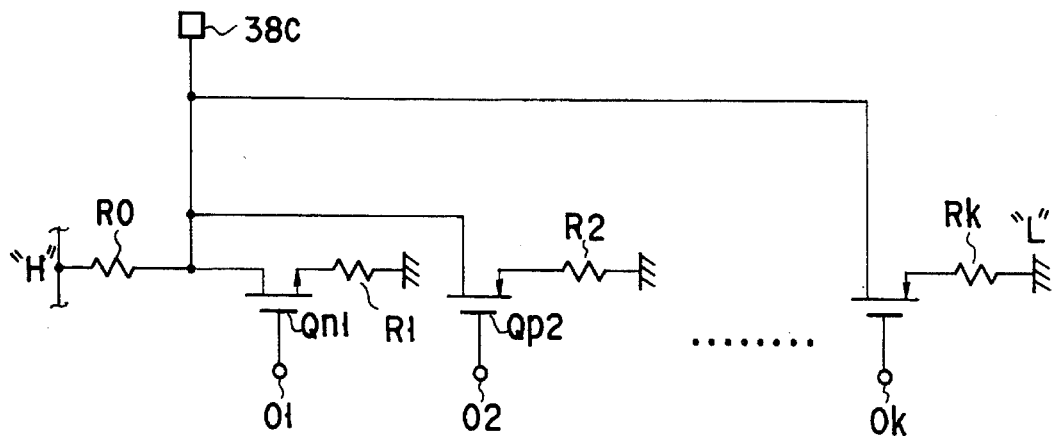
F I G. 5

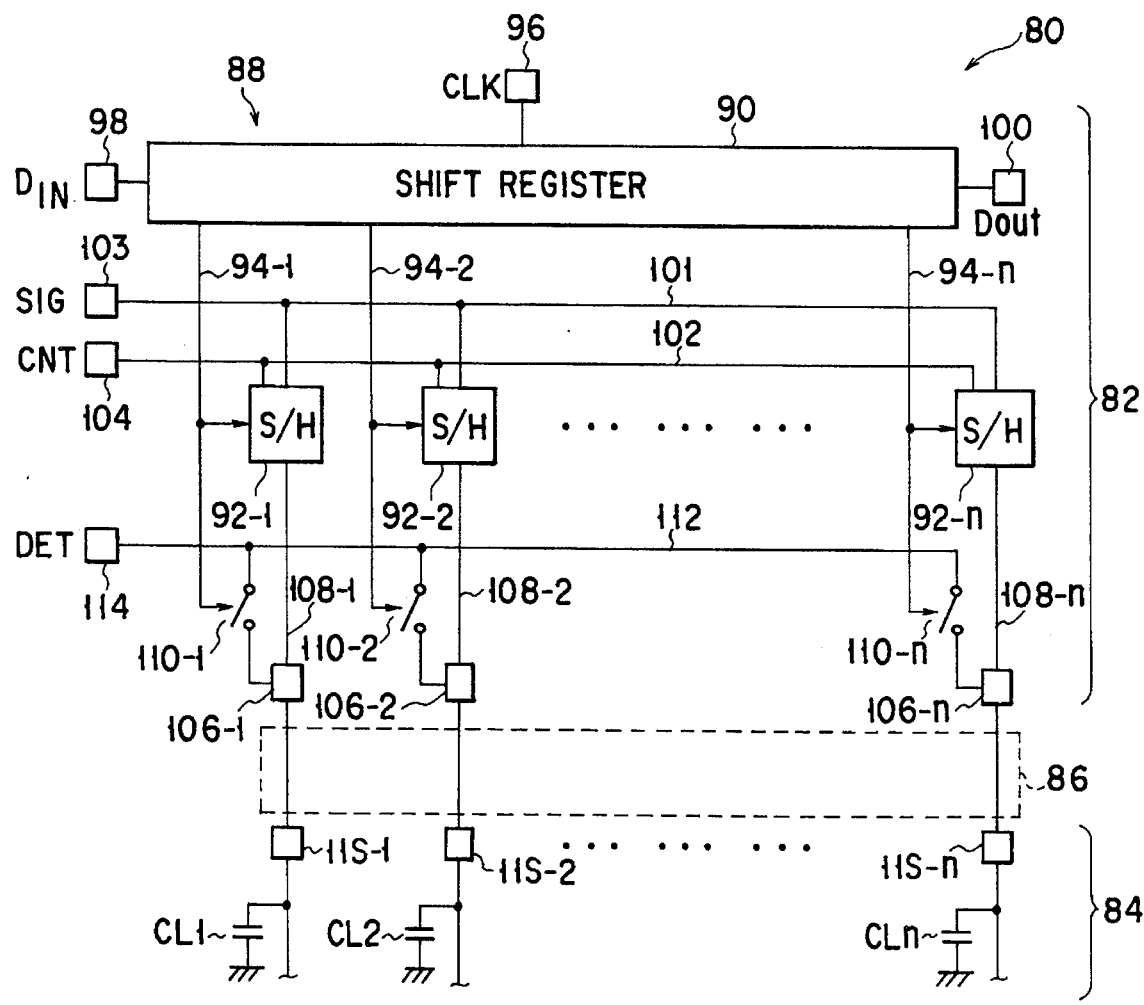
F I G. 10

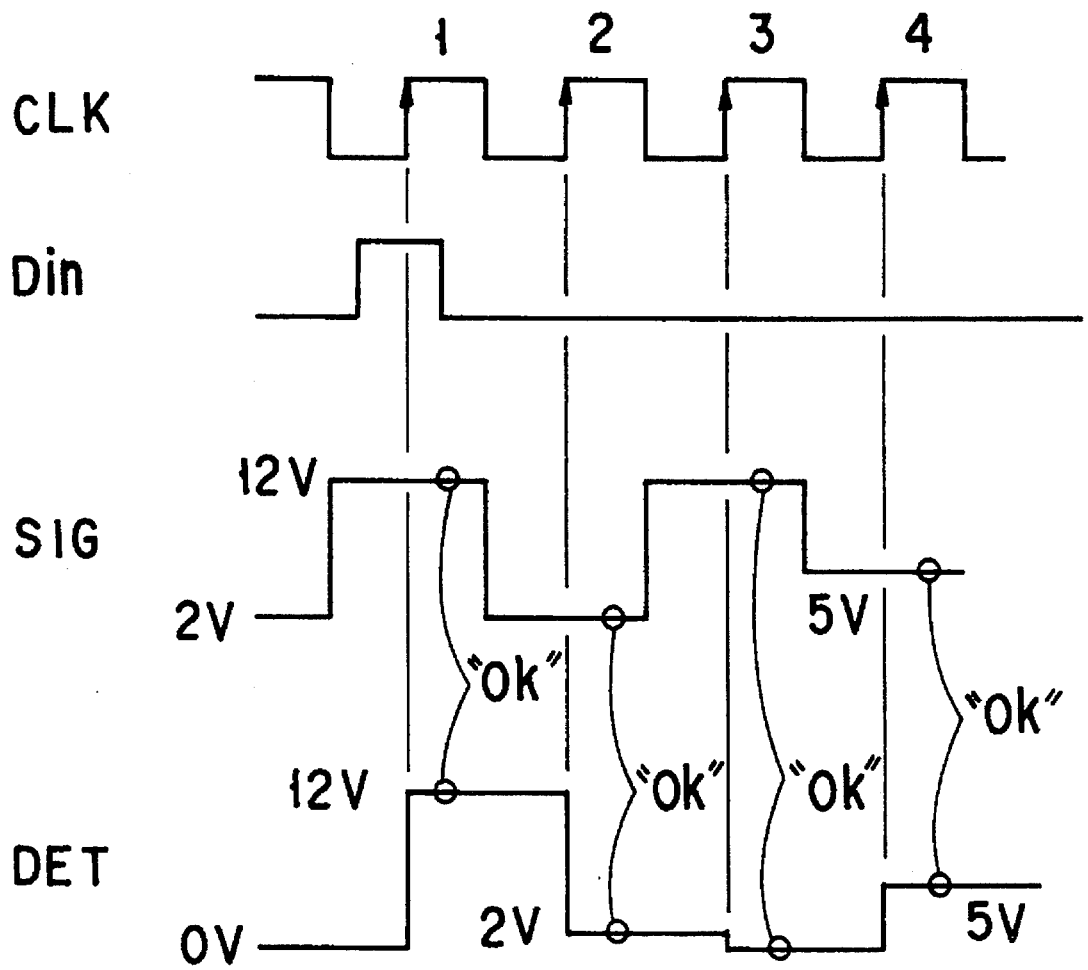
F I G. 11

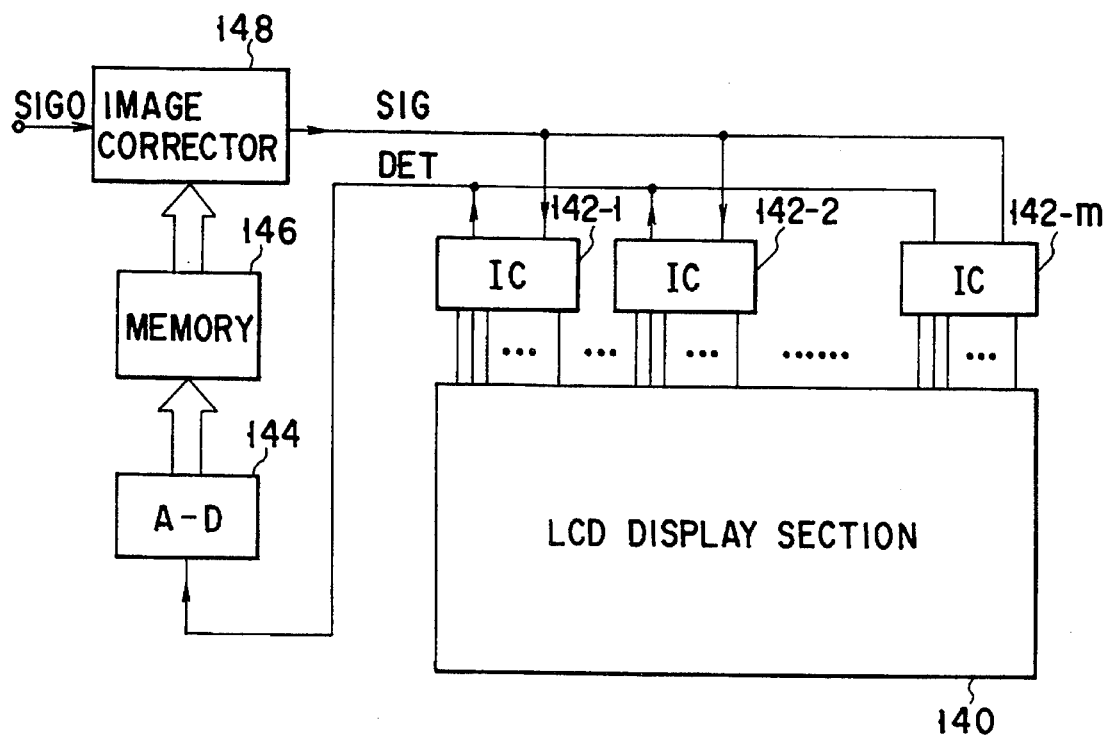
FIG. 16
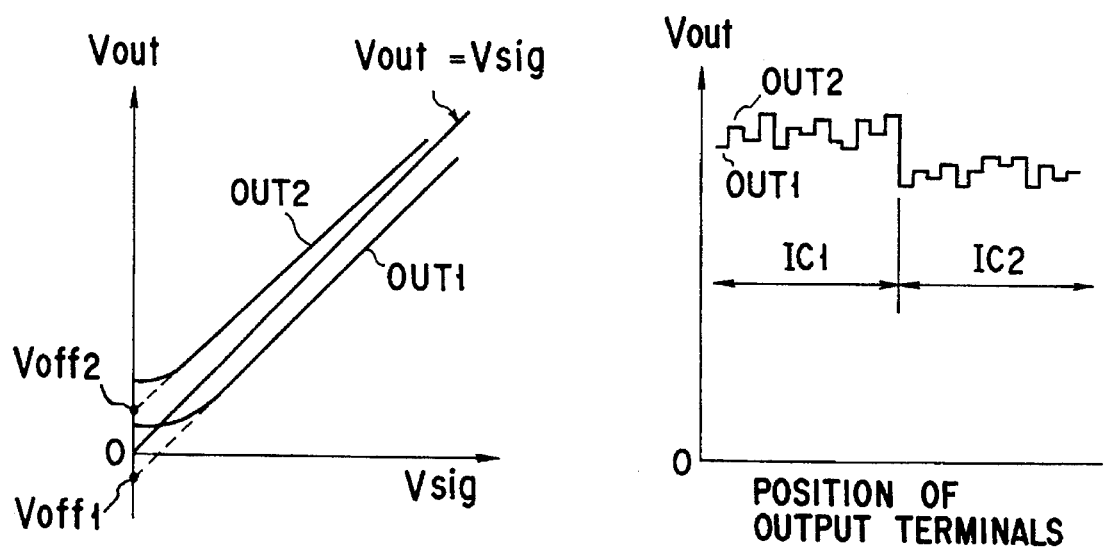
FIG. 17
FIG. 18

INTEGRATED CIRCUIT DEVICE WITH INTERNAL INSPECTION CIRCUITRY

BACKGROUND OF THE INVENTION

1. Field of the Invention

The present invention relates to highly integrated electronic circuit devices and, more particularly, to an inspection circuitry for facilitating the operation tests for multiple-terminal semiconductor integrated circuit (IC) devices, each having an increased number of input/output terminal pins aligned at a decreased pitch. The present invention also relates to a technique of facilitating an operation test and/or a mounting state inspection for a semiconductor integrated circuit device for electrically driving a thin-plate type display device such as an active-matrix type liquid crystal display (LCD) unit.

2. Description of the Related Art

With the recent development of solid-state integrated circuit (IC) technology, semiconductor IC devices or large-scale integrated circuits (LSIs) have greatly increased in integration density or packing density of internal elements. As the integration density increases, the external connection terminal pins of a semiconductor IC package increase in number and decrease in layout pitch (pad pitch). The presently available semiconductor IC devices include a highly integrated LSI device which has 300 external terminals or more, and the pad pitch of 80 micrometers or less. Such "multiple-terminal/small-pitch" semiconductor device is widely used in the manufacture of digital equipment, especially for highly advanced electronic circuit sections which drive ASICs, thin plate type displays (such as LCD panels), the printing heads of thermal printers, and the like.

Conventionally, when the highly integrated semiconductor IC devices are subjected to an inspection including operation tests, the test probe pins of a probe card are brought into contact with almost all external terminal pins of each IC to be inspected, including signal input terminals and signal output terminals, thus checking the operation of each internal circuit and discriminating non-defective devices. In this case, the input/output terminals also serve as check terminals. Some ICs may have one or a plurality of check terminals exclusively used for inspection in addition to the input/output terminals. Even in such a case, in order to execute an intended inspection, it is required that the probe pins be brought into contact with almost all package terminal pins.

However, as the tendency to increase the number of terminals and decrease the pitch grows with an increase in the integration density of IC devices, it is becoming difficult more and more for the conventional IC inspection scheme to satisfactorily cope with the "multiple-terminal/small-pitch" IC devices. Mechanical and dimensional limitations are imposed on the total number of pins and the minimum pin pitch of a probe card. Typically, the maximum number of pins and minimum pin pitch of such probe card, attained in the existing conditions, are about 300 and 80 micrometers, respectively. Obviously, if the maximum number of pins and minimum pin pitch of a target IC exceed the above limits, the conventional inspection method is no longer effective.

The same goes with the inspection of operations of LCDs which have been applied extensively with the recent tendency toward smaller electronic devices. As the number of external connection terminal pads arrayed on a panel substrate increases, the conventional "probe inspection" scheme cannot achieve a satisfactory inspection. As terminal pads are arranged at higher density, it becomes more difficult to perform the pin-positioning alignment to bring all the probe pins into contact with the terminal pads at a time, thus resulting in the inspection reliability being decreased.

SUMMARY OF THE INVENTION

It is therefore an object of the present invention to provide a new and improved inspection technique which can facilitate an operation test for a highly integrated multiple-terminal/small-pitch electronic device, while attaining an enhanced reliability.

It is another object of the present invention to provide a new and improved highly integrated multiple-terminal/small-pitch electronic device which can facilitate an operation test therefor, while achieving an enhanced reliability.

In accordance with the objects, the invention is drawn to a specific electronic circuit device, which includes a substrate, and an electronic circuitry having a plurality of signal carrying terminals on the substrate. One or a plurality of extra terminals are arranged on the substrate. These extra terminals are less in number than the signal carrying terminals, and are adapted to be externally coupled to an electric inspection tool. An inspection enabling section is arranged on the substrate and coupled to the signal carrying terminals and the extra terminals, for causing electric potentials at the signal carrying terminals to be transferred to the extra terminals.

BRIEF DESCRIPTION OF THE DRAWINGS

FIG. 1 is a circuit diagram showing schematically the overall configuration of a semiconductor integrated circuit (IC) device in accordance with one preferred embodiment of the present invention.

FIG. 2 is a circuit diagram showing a modification of the integrated circuit device of FIG. 1.

FIGS. 3 to 6 are circuit diagrams each showing the internal arrangement of a transistor logic circuit shown in FIGS. 1 and 2.

FIG. 10 is a diagram showing the overall arrangement of an LCD drive system in accordance with a further embodiment of the invention.

FIG. 11 is a timing diagram showing the pulsing sequences of main electrical signals generated at main components of the embodiment of FIG. 10.

FIG. 16 is a circuit diagram showing a further embodiment of the invention.

FIGS. 17 and 18 are characteristic diagrams of the embodiment for explaining the significance thereof over the prior art.

DETAILED DESCRIPTION OF THE PREFERRED EMBODIMENTS

Figure 6:
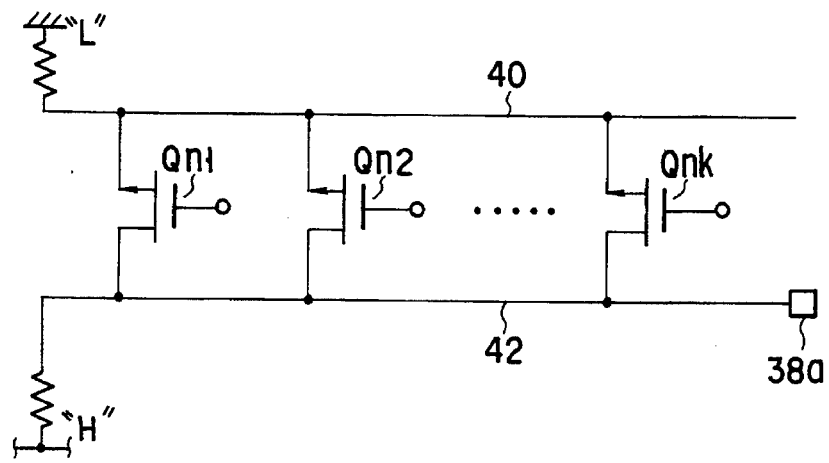

Referring now to FIG. 1, a semiconductor integrated circuit (IC) device in accordance with one preferred embodiment of the present invention is generally designated by the numeral 20. The IC 20 incorporates a functional block circuit 22. Internal circuit 22 is designed on a semiconductor chip substrate (not shown) to attain a predetermined circuit function. Internal circuit 22 has an array of external connection terminal pins 24. These terminal pins 24 are a group of metal pins to be arranged on the package (not shown) of the device. Terminals 24 are supplied with electrical input signals, which are transmitted by way of a corresponding number of signal transmission lines 26. The input signals are denoted by reference symbol "A" in FIG. 1.

A plurality of output signals B of the internal circuit 22 are sent to an array of external output terminal pins 30 through signal transmission lines 28. The output signals B are transmitted simultaneously to a logic circuit 32 through signal transmission lines 34 branching from the lines 28.

The logic circuit 32 is a digital logic circuit that executes a preselected kind of logic operation with respect to the supplied input signals B to generate output signals being smaller in number than the input signals. Output signals C of logic circuit 32 are supplied through signal transmission lines 36 to an array of check terminal pins 38 used for an inspection. These pins 38 are adapted to be coupled to an external monitor circuit (not shown). By externally taking signals C out of check terminal pins 38, it can be determined whether the internal circuit 22 operates normally.

An integrated circuitry 20a shown in FIG. 2 is similar to that of FIG. 1 with the output signals B being supplied to the logic circuit 32 by way of the array of output terminals 30. In the both circuits 20 and 20a, the circuits 22, 32 and the terminals arrays 24, 30, 38 are arranged on the same semiconductor (silicon) wafer.

Three alternative arrangements for the logic circuit 32 of FIGS. 1 or 2 are shown in FIGS. 3 to 5. In the first place, referring to FIG. 3, the logic circuit 32 includes a plurality of multiple-input NOR gate circuits. Each of these NOR gates consists of N-channel type metal oxide semiconductor field effect transistors (MOSFETs) Qn1, Qn2 . . . , Qnk. MOSFETs Qn have first current-carrying electrodes (drains) which are coupled in common to a check terminal 38a, and second current-carrying electrodes (sources) being coupled to the ground potential (the low or "L" level) through resistive elements R1, R2, . . . Rk, respectively. The first current-carrying electrode of first-stage MOSFET Qn1 is also coupled to a high or "H"-level voltage (H) by way of a resistor R0. The gate electrodes of MOSFETs Qn serve as the outputs O1, O2, . . . , Ok, which are coupled to the array of output terminal pins 30 as shown in FIG. 1 or 2 to receive the output signals B of internal circuit 22 in a parallel manner.

A logic circuit shown in FIG. 4 may alternatively include a plurality of AND gates, each of which consists of P-channel type MOSFETs Qp1, Qp2, . . . , Qpk. These MOSFETs Qp are coupled to a corresponding check terminal 38b in substantially the same manner as in the circuit of FIG. 3.

A logic circuit illustrated in FIG. 5 is a specific circuitry that can allow the execution of what is called the "short-circuit test," which is the test to determine whether or not the output terminals are correctly isolated between any adjacent ones thereof without the occurrence of any undesirable short-circuiting, as well known among those skilled in the art. The logic circuit of FIG. 5 includes N-channel type MOSFETs Qn1, . . . and P-channel type MOSFETs Qp1, . . . , which are alternately positioned as shown in FIG. 5. The connection of each MOSFET Qn, Qp is similar to that of a corresponding one of MOSFETs of FIGS. 3 and 4.

The logic functions of the two logic circuits shown in FIGS. 3 and 4 may be summarized as shown in the following Table 1.

TABLE 1

| | NOR gate | | NAND gate | |
|---|---|---|---|---|
| Outputs O1–Qk | "L" All | Others | "H" All | Others |
| Test Trmnl 38 | "H" | "L" | "H" | "L" |
| Judgment | OK | NG | OK | NG |

As is apparent from Table 1, in the NOR type logic circuit, when the internal circuit 22 operates normally upon reception of a set of input signals A which cause all the output signals O1, O2, . . . , Ok to be at the logic "L" level, the check terminal 38a potentially rises to the "H" level. At this time, a determination result "OK" is output. Alternatively, if at least one of the output signals O1–Ok goes to the "H" level due to the occurrence of an error in operation, the check terminal potential is set at "L" level. In this case, it is determined that internal circuit 22 is defective or not-good (NG).

In the AND type logic circuit, when the internal circuit 22 operates normally upon reception of a set of input signals A which set all the output signals O1–Ok at the logic "H" level, the potential of the check terminal 38a rises to the "H" level. At this time, a determination result "OK" is output. In the other cases, that is, if at least one of the output signals O1–Ok falls down to the "L" level due to an operation error, the check terminal potential is at "L" level. In this case, it is determined that internal circuit 22 is defective (NG). Note here that, while the logic gate circuit is arranged using the P-channel MOSFETs in the circuit shown in FIG. 4, if these MOSFETs are replaced with N-channel MOSFETs having the drains and sources of respective transistors being connected to each other, a NAND type logic circuit is obtained. In such case, when input signals are supplied to internal circuit 22 to set all the output signals O1–Ok at the "H" level, the check terminal is at "L" level. If an abnormality occurs in one of the input terminals of internal circuit 22 to cause the corresponding potential to be at "L" level, the potential of the check terminal goes to the "H" level.

The logic function of the "short-circuit check gate" circuit of FIG. 5 is summarized in Table 2.

TABLE 2

| | Short-circuit Check Gate | |
|---|---|---|
| Outputs O1–Qk | "L" at N-MOSFET "H" at P-MOSFET | Other Cases |
| Test Trmnl 38c | "H" | Other than "H" |
| Judgment | OK | NG |

Assume that the gate electrodes of the N-channel MOSFETs are at the "L" level, and at the same time those of the P-channel MOSFETs are at the "H" level. In this case, if the internal circuit 22 operates normally, an "H"-level potential appears at a check terminal 38c. If an undesirable short-circuit takes place between adjacent ones of the terminals of internal circuit 22, the potential at the corresponding portion varies to deviate from the normal value to be expected on the basis of the circuit design. A resulting potential can be calculated on the basis of the design values such as resistances in the circuit. By making use of the calculated value as a threshold value for determining defects, defective circuits can be reliably determined. By using an appropriate one of the logic circuits of FIGS. 3 to 5, the determination of an operation test for the multiple-terminal/small-pitch internal circuit 22 can be successfully performed while allowing required check terminals to decrease in number.

A practical circuit configuration of the NOR type logic circuit 32 of FIG. 3 is shown in FIG. 6, wherein the N-channel MOSFETs Qnl to Qnk are coupled at their source, drain and gate electrodes to one another by employing a pair of parallel wiring lines 40, 42 that are minimized in length. In the circuits of FIGS. 3 to 6, the MOSFETs may be replaced with known bipolar transistors or diodes, if required.

Figure 7A:
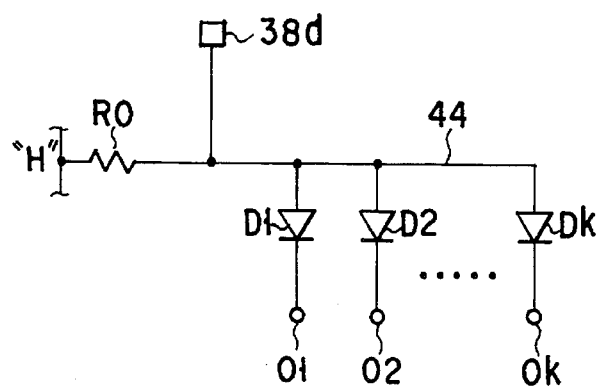
FIGS. 7A and 7B are diagrams each showing a diode logic circuit that may also be employed as the logic circuit of FIG. 1 or 2.
Figure 7B:
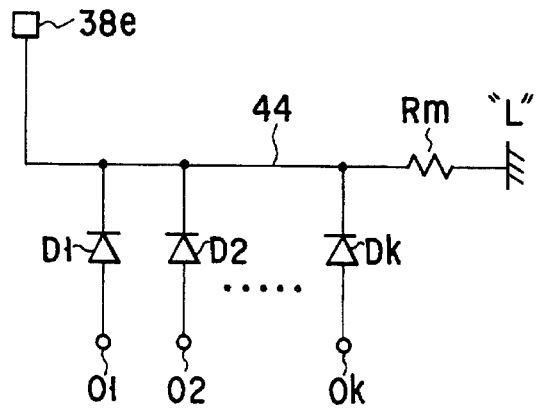

Two possible examples of logic circuit configuration using diodes are illustrated in FIGS. 7A and 7B. As shown in FIG. 7A, diodes D1, D2, . . . , Dk are arranged in parallel with one another. Diodes D have first electrodes (N-side electrodes) being coupled to the outputs O1–Ok respectively, and second electrodes (P-side electrodes) connected together through a check terminal 38d by way of a wiring line 44. Line 44 has one end portion coupled through resistor RO to the "H" level potential. When the internal circuit 22 operates normally upon reception of the output signals A which causes all the output signal O1–Ok to be at the "H" level, a check terminal 38d rises at "H" level. When an abnormality, e.g., an operation error, occurs in circuit 22, one or a plurality of output signals O1–Ok may be at "L" level. If this is the case, the check terminal 38d potentially falls from the "H" level to a predetermined level lower than the "H" level by a specific difference corresponding to a voltage drop at the resistor. A judgment is then made to indicate a "defect" (NG).

Another diode logic circuit is shown in FIG. 7B, wherein the diodes Dl to Dk are connected in the opposite direction to the diodes of FIG. 7A. A wiring line 44 has one end connected to a check terminal 38e, and the other end connected through a resistor Rm to the ground potential that is equivalent to the "L" level. With such an arrangement, if the internal circuit 22 operates normally upon reception of a set of output signals A which set all output signals O1–Ok to the "L" level, check terminal 38e is at "L" level. When an abnormality (e.g., an operation error) occurs in circuit 22, one or a plurality of output signals O1–Ok will be at "H" level. If this is the case, check terminal 38e rises in potential from the "H" level to a predetermined level that is higher than the "H" level by a certain difference corresponding to an actually generated voltage. As a result, a defect (NG) is determined.

The significant advantage of the "built-in inspection logic" type semiconductor IC devices 20, 20a is that an operation test for the internal circuit 22 can be performed easily and accurately with the assistance of the logic circuit 32. The logic circuit 32 is a logic gate circuit for generating logic output signals (C) smaller in number than input signals (B) as previously explained; therefore, even if the terminals whereat the output signals B of internal circuit 22 are generated are increased in number to conform to the trend toward a larger number of terminals and smaller pitch, which grows with an increase in integration density, the operation inspection can be performed with high reliability by connecting an ordinary inspection probe device, having a terminal arrangement conforming to the existing manufacturing technology limitations, to the decreased number of check terminal pins 38 while monitoring the potentials of these check terminals. This will remain advantageous to the semiconductor manufacturers who are strictly required to manufacture highly integrated semiconductor IC devices.

Figure 8:
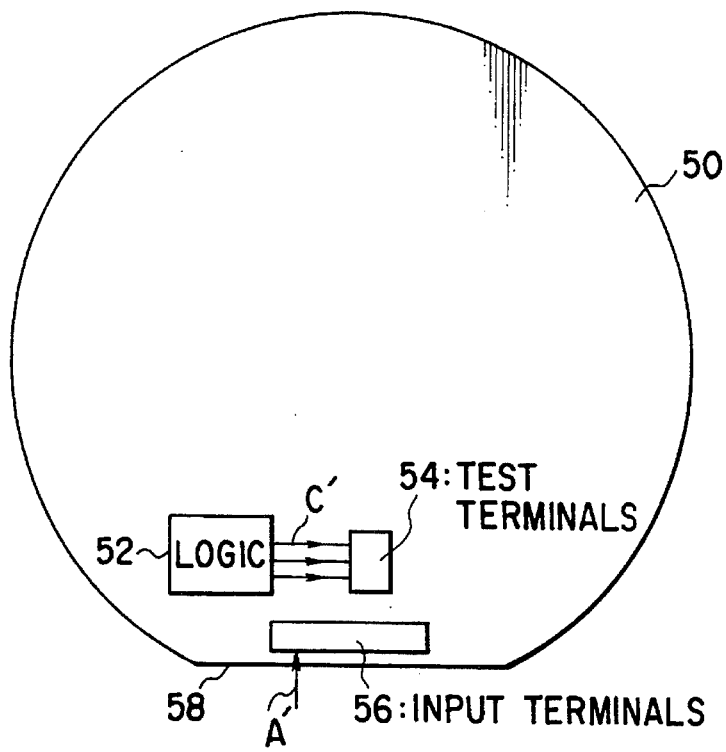
FIG. 8 is a diagram showing the plan view of a semiconductor wafer device in accordance with another embodiment of the invention, wherein a number of semiconductor integrated circuit chips are formed on the wafer.

An embodiment of the invention as illustrated in FIG. 8 is an inspection circuitry which is arranged by applying the the above-described concept of "built-in inspection logic" of the present invention to a semiconductor wafer 50 (from which a plurality of semiconductor IC chips are cut), rather than to every individual semiconductor IC chip.

A logic circuit 52 is formed on the wafer 50, on which a plurality of internal circuits 22 (not shown in FIG. 8) are defined. Each of such circuits may be similar in arrangement to the internal circuit 22 of FIG. 1. Logic circuit 52 is supplied with output signals B of each internal circuit 22 or output signals C of a logic circuit 32 (not shown) of each chip. Test terminals 54 are formed on the wafer 50, for allowing the output signals C' of logic circuit 52 to be taken out externally. An input terminal section 56 is formed at a preselected position on wafer 50 to receive an external input signal A'. Necessary wiring lines (not shown) are formed on wafer 50, for causing the input signal A' from input terminal section 56 to be delivered as input signals A to the internal circuits 22 of IC chips on wafer 50.

With such an arrangement, by coupling either the output signal B of each internal circuits 22 or the output signal C of each logic circuit 32, and by connecting the output signals C' processed by the logic circuit 52 to the inspection terminal 56, it becomes possible to perform the operation inspection for internal circuits 22 on wafer 50 and to carry out what is called the "burn-in" test under the wafer condition while allowing the pin-connection points to be decreased in number (about ten to twenty per wafer). This wiring technique will be more effective especially for semiconductor elements of high production yield.

In regard to the positioning of the logic circuit 52 on the wafer 50, while no serious problems will occur if the circuit is formed within the element-formation region of wafer 50, it will be recommendable, by taking into consideration the fact that such logic circuit 52 will no longer required after an inspection is performed (after IC devices are physically cut off from wafer 50), that circuit 52 is specifically positioned in a peripheral region of wafer 50 near a dicing line 58 thereof, which region is inherently a useless surface area for the manufacture of IC devices, thereby to attain an increased efficiency of wafer-surface usage. Regarding the size of each terminal used for inspection, in consideration of easy probing, inspection is generally facilitated by setting input terminals (e.g., power supply and control terminals) and check terminals to be greater in terminal size and terminal pitch than those of output terminals.

As the terminals of a semiconductor device increases in number and decreases in pitch, the packaging for IC devices has been changed from the conventionally employed resin-molding plastic IC package and a ceramic IC package to a tape carrier package (TCP) which can provide the multiple-terminal/miniaturized-pitch connection. The "direct-connection chip-mounting" method has also been used for a bare chip such as a "flip chip" which is directly connected.

Especially when the bare chip is to be mounted, the inspection of a semiconductor device or a burn-in test cannot be performed satisfactorily, and hence it has been conventionally difficult to ensure the reliability of the semiconductor device. The difficulty can be eliminated successfully by employing the embodiment of FIG. 8, which will demonstrate great significance in this respect, also.

Figure 9:
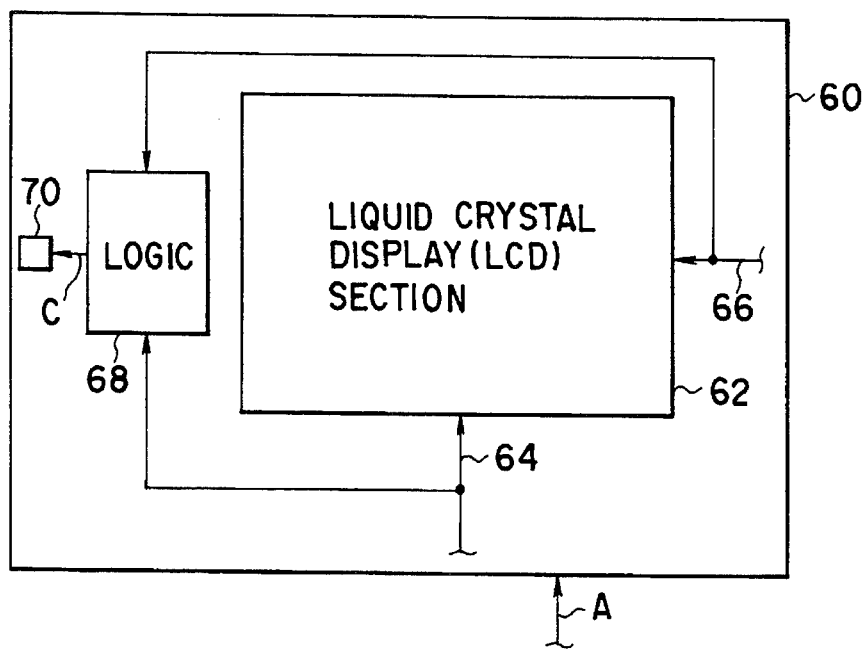
FIG. 9 is a circuit diagram showing schematically the overall arrangement of an integrated circuit device containing a liquid crystal display (LCD) section and a driver circuit section therefor in accordance with a still another embodiment of the invention.

A liquid-crystal display (LCD) device in accordance with a still another embodiment of the invention is shown in FIG. 9, wherein the LCD device is an active-matrix type LCD incorporating thin-film transistors (TFTs), called as "TFT-LCD" for short, which is one of the most popular LCD devices.

As shown in FIG. 9, a panel-mounting printed wiring board 60 has a surface on which a LCD section 62, signal lines 64, and scanning lines 66 are formed. Signal lines 64 and scanning lines 66 are arranged in a matrix form in LCD section 62. A logic circuit 68 is formed on printed circuit board 60 to have input terminals connected to signal lines 64 and scanning lines 66. Board 60 is also provided with check terminals 70 for extracting output signals from the logic circuit 68.

In this arrangement, input signals A are supplied to the printed circuit board 60. Input signals A are processed so as to drive the LCD section 62, and are then transmitted through the signal lines 64 and the scanning lines 66 to the logic circuit 68 on board 60. Logic circuit 68 may also be formed at an arbitrary portion of the board 60, e.g., a portion inside or outside the signal lines 64. Logic circuit 68 performs various kinds of logical operations. The operation results are transmitted, as output signals C, to the check terminals 70. Signals C are externally taken out of check terminals 70. Monitoring the signals C enables to determine whether the drive IC operates normally or is mounted in a correct way, and further to determine whether the LCD operates normally.

The logic circuit 68 has the same arrangement as that in one of the embodiments previously described with reference to FIGS. 3 to 6. In an actual execution of inspection, the input signals A are supplied to the board 60 after the drive IC is mounted on board 60, and the probe pins of an inspection probe device are brought into contact with the check terminals 70, thus monitoring output signals derived from logic circuit 68. In this case, in addition to the inspection of the signal lines 64, the occurrence of a short-circuit among these signal lines 64 or the scanning lines 66 can be discriminated, thus allowing an easy operation inspection with high reliability.

In this embodiment, the drive IC is mounted by using the COG mounting technique using a low-melting metal. As is apparent from FIGS. 3 to 6, the inspection of the operation and mount state of the drive IC can be performed by bringing the probe pins into contact with only the check terminals of the logic circuit, which are required for determining whether the IC operates normally, regardless of a large number of outputs (1, 2, .... k) from the drive IC (the number of signal lines or scanning lines), thus greatly facilitating an inspection process.

While the embodiment exemplifies the drive IC mounted by the COG mounting scheme, this embodiment may be modified as follows. An LCD device may use a polycrystalline silicon and is integrated with a drive IC. In such a case, arranging the logic circuit of the present invention in the display can make easier the inspection of the LCD device.

In the embodiment of FIG. 9, the logic circuit 68 is provided in correspondence with the output of each drive IC; however, if it is predictable that the drive IC is lesser in the occurrence of operation defects and mounting defects, the inspection can be further facilitated by forming a logic circuit having a single signal line or scanning line.

The LCD device can be easily manufactured by the existing LCD manufacturing technology, although the required mask members and the process number are slightly increased during the manufacture of the device due to the addition of the logic circuit 68 and the check terminals 70. In general, the step in mounting a drive IC is performed after a cell-fabrication step. If, however, the LCD device of the present invention is used, inspection is facilitated. Therefore, by incorporating the mounting step in the cell step, the limitations on the mounting step can be reduced or lightened to allow the execution of a "reflow" step, which leads to the achievement of a highly reliable mounting process. More specifically, the drive IC mounting process is done after rubbing in the cell step and before bonding of opposing substrates and injection of a liquid crystal, and the inspection of operation and mount state of the drive IC is performed by monitoring signals appearing at the check terminals on the display substrate on which a logic circuit has already been fabricated. With such operations, the limitations of chip-mounting process are reduced to facilitate the inspection. Furthermore, it is possible, by mounting a drive IC having a high fraction defective at an early stage, to reduce any undesirable damage to normal portions, which will take place during a repairing process. This process facilitates the inspection of display substrate and allows the inspection to be performed at an early stage, and hence is effective for the inspection of the display substrate.

According to the embodiment of FIG. 9, the logic circuit 68 connected to some or all of the signal lines 64 and the scanning lines 66 for driving the LCD section 62 is formed in the display panel mount printed wiring board 60 so as to allow the execution of inspection on the basis of outputs from the logic circuit 68. Therefore, inspection of the operation and mounted state of a drive IC is facilitated. That is, inspection can be performed without bringing the probe pins into contact with a plurality of terminals (several hundreds in some cases) for driving a display screen. As a result, the reliability of inspection can be improved. In addition, since the signal lines 64, the scanning lines 66, and the output terminals of each drive IC need not be connected to the probe pins, the pixel pitch or the pitch of the output terminals of the drive IC can be further decreased.

A further embodiment of the present invention is shown in FIG. 10, wherein an active matrix type liquid crystal display (LCD) drive system is generally designated by the numeral 80. LCD drive system 80 includes two main components 82, 84. The first component 82 is a semiconductor IC device; the second component 84 is an LCD matrix circuit unit. These two separate units 82, 84 are connected to each other by an electrical connection means, such as a known thin flexible wiring connector 86.

The integrated circuit unit 82 includes an internal circuit 88, which includes a shift register circuit 90 and a plurality of sample/hold circuits 92-1, 92-2, . . . . , 92-n, thus achieving the function of a so-called "analog driver" circuit. Shift register 90 has outputs coupled to sample/hold circuits 92 by way of signal transmission lines 94-1, 94-2, . . . , 94-n, respectively. Shift register 90 has a clock terminal 96, a shift-start control terminal 98 and a shift-termination control terminal 100. Sample/hold (S/H) circuits 92 are connected by signal lines 101, 102 to a signal input terminal 103 and a control terminal 104. The outputs of S/H circuits 92 are coupled to a number of output terminals 106-1, 106-2, ..., 106-n through signal lines 108-1, 108-2, ..., 108-n, respectively.

Very importantly, the output terminals 106 of the internal circuit 88 are provided with switch selector circuits 110-1, 110-2, ..., 110-n, which have first nodes directly coupled to output terminals 106, respectively. Switch selector 110 has second nodes that are connected through a signal line 112 to a monitor-output terminal 114. The control nodes of switches 110 are coupled to the outputs of the shift register 90 by way of wiring lines 94, respectively. Selector switches 106 may be analog switch devices, including known metal oxide semiconductor field effect transistors (MOSFETs).

As shown in FIG. 10, the LCD matrix circuit unit 84 has a number of signal input/output terminals 115-1, 115-2, ..., 115-n, which correspond in number to the output terminals 106 of the driver IC unit 82. Capacitive elements CL1, CL2, ..., CLn are coupled with terminals 132 respectively; each of these capacitors CL is illustrated to represent an equivalent capacitor component that is inherently present as a stray or parasitic capacitance of a corresponding wiring line associated therewith. The capacitance of the capacitor CLi may range from several tens to several hundreds picofarads (pF). The capacitors CL serve as loads of the output terminals.

When an electrical image signal SIG is supplied at the terminal 106, the internal circuit (analog driver circuit) 88 distributes image signal SIG among the output terminals 106-1, 106-2, ..., 106-n in a well known manner. Shift register 90 operates in response to a clock signal CLK, which is supplied to terminal 96, and a shift-start control signal Din being supplied at terminal 98. The resultant pulse signals of shift register 90 are sequentially generated at the shift-register outputs, i.e., the output lines 94-1, 94-2, ..., 94-n. The pulse output signals are then supplied to S/H circuits 92-1, 92-2, ..., 92-n, which sample and hold the pulse output signals sequentially in the order that they arrive at S/H circuits 92. These output signals are distributed among output terminals 106-1, 106-2, ..., 106-n of analog driver circuit 88.

The analog switches 110-1, 110-2, ..., 110-n are rendered conductive (turn ON) sequentially in synchronism with the sampling/holding operations of S/H circuits 92 in response to the pulse output signals of the shift register 90. Analog switches 110 force the potentials at the output terminals 106-1, 106-2, ..., 106-n to be sequentially sent to the check terminal 114. This allows an operation-monitoring test procedure for the analog driver circuit 88 to be carried out sequentially while comparing the image signal SIG with an output potential DET of check terminal 114, thereby to determine whether circuit 88 operates normally.

With the embodiment 82, when the coincidence between the two signals SIG, DET is detected at a predetermined timing, it is determined that the analog driver circuit 88 operates normally. Otherwise, the circuit 88 will be determined to operate erroneously (i.e., failure in an operation test). The potential changes of signals generated at the main terminals of the embodiment circuit are shown in the timing diagram of FIG. 11, wherein "OK" indicates that the potentials of signals coincide with each other.

Figure 12:
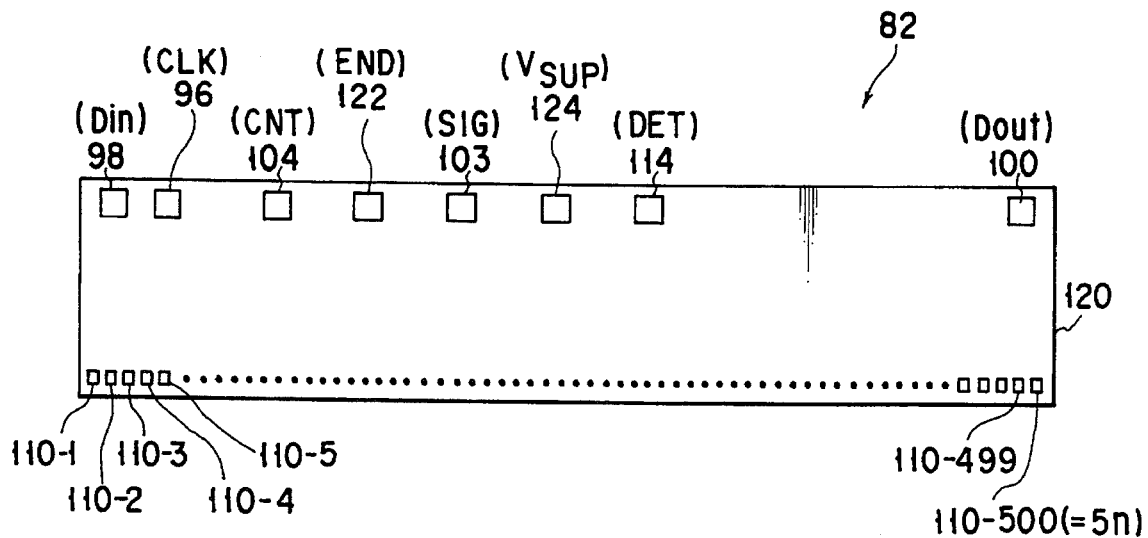
FIGS. 12 and 13 illustrate in plan view two possible examples of an LCD driver circuit section shown in FIG. 10.

The overall plan view of the integrated circuit 82 of FIG. 10 is shown in FIG. 12, wherein an IC chip substrate 120 has an elongated flat shape. Various signal terminals including signal terminals 96, 98, 100, 103, 104, 114 are linearly arranged alone one of the two opposing longer sides of substrate 120. Terminals 122, 124 are power supply terminals. Output terminals 110 of circuit 82 are linearly arranged along the other side of the two opposing long sides of substrate 120. This embodiment assumes that "n" is 100; a total of 5n= 500 output terminals 110-1 to 110-500 are formed.

The substrate 120 measures 2.2 mm by 10.5 mm. Metal terminal pad of each of the terminals 96, 98, 100, 103, 104, 114, 122, 124 has a square shape that measures 10 micrometers in each side. A pitch P1 of these terminals is 20 micrometers or more. Each of the power supply terminals 122, 124, the image signal input terminal 103, the check terminal 114, the clock terminal 96, and the shift-start/termination control terminals 98, 100 is 100 micrometers square. The minimum pitch of these terminals is 200 micrometers. These data demonstrate that the substrate 120 can be effectively miniaturized even in an highly integrated circuit having as many as 500 output terminals. In this case, the operation inspection was successfully performed by using a probe device having test pins arranged at a relatively large pitch, specifically about 10 pins per chip.

Figure 13:
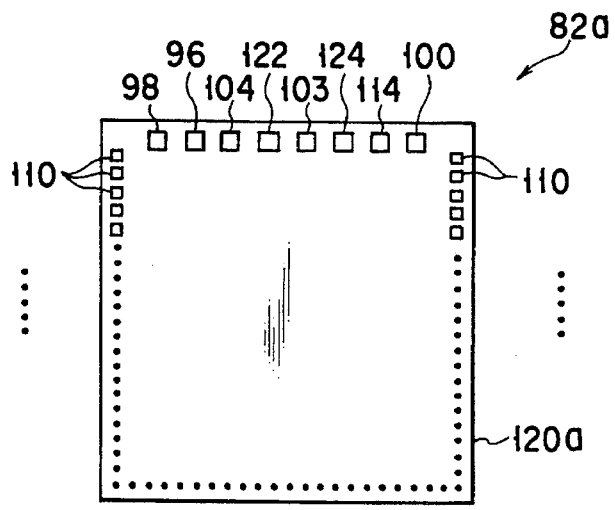

The substrate 120 may be modified as shown in FIG. 13, wherein a substrate 120a has a square planar shape with four peripheral edge lines. The various kinds of signal terminals 96, 98, 100, 103, 104, 114, 122, 124 are aligned linearly. The output terminals 110 are arranged along the three remaining edge lines as shown in FIG. 13.

During an operation test using the terminal check terminal 114, the potentials at the output terminals 106 of the integrated circuit unit 82 may vary depending on the actual load capacitances of the output terminals 106. On the basis of these output terminal potential variations, it can be detected whether the electrical connection between output terminals 106 and terminals 115 of the LCD matrix circuit unit 84 is properly attained by way of the connector 86. More specifically, the control terminal 104 is arranged to control the drive capacity of the buffer amplifier of each of the S/H circuits 92 so as to temporarily decrease to about $\frac{1}{10}$ to $\frac{1}{100}$ that in a normal operation. If terminals 106 and terminals 115 are properly connected to each other without any connection failure (e.g., disconnection), terminals 106 potentially decrease due to the load capacitances CL. If a connection failure occurs between terminals 106 and terminals 115, a terminal 106i (i= 1, 2, ..., n) at the corresponding position is maintained at a potential obtained in a normal operation regardless of the presence/absence of a load capacitance CLi. A terminal potential variation at each of the plurality of terminal pairs (106, 115) sequentially appears at the check terminal 114 upon sequential switching of the selector switches 110. Therefore, the electrical connection between the terminals can be successfully inspected by monitoring the potential at the terminal 114 over time.

Note that the capacitance of each of the output terminals 106 is 1 pF or less. The selector switches 110 and the common signal line 112 each have a capacitance of several pF to several tens pF, which is approximately $\frac{1}{10}$ the wiring parasitic capacitance CL. Such a capacitance difference assures that the decision on the connection state between the terminals can be performed accurately. If an external wiring line (not shown) connected to the check terminal 114 has a large parasitic capacitance, a deterioration in decision reliability can be compensated by adding a buffer amplifier between the common line 112 and the terminal 114.

The significant advantage of the embodiment circuit 82 is that the operation inspection of the circuit 88 having the n output terminals 106 can be easily and accurately performed by bringing a single probe pin into contact with the signal terminal 114. In other words, it becomes possible to successfully perform the operation inspection of a highly integrated "multiple-terminal/small-pitch" IC device by using one or a decreased number of check terminals. This means that the circuit operation inspection can be performed with high reliability by using a test probe device produced under the existing manufacturing technique limitations, even in a case wherein an integrated circuit to be inspected increases in the number of terminals and decreases in terminal pitch in the future in order to meet the demand for a higher integration density.

Another significant advantage of the embodiment 82 is that, since it is no longer required to cause the pins of a test probe to be brought into direct contact with an increased number of terminals of the circuit 82 to be inspected, the circuit 82 is free from the design limitation that the pitch of the output terminals of circuit 82 must coincide with that of the probe pins. This allows the output terminals of circuit 82 to be arranged at an arbitrary small pitch in accordance with the trend toward a larger number of terminals. As a result, an increase in the number of output terminals can be achieved as needed.

Figure 14:
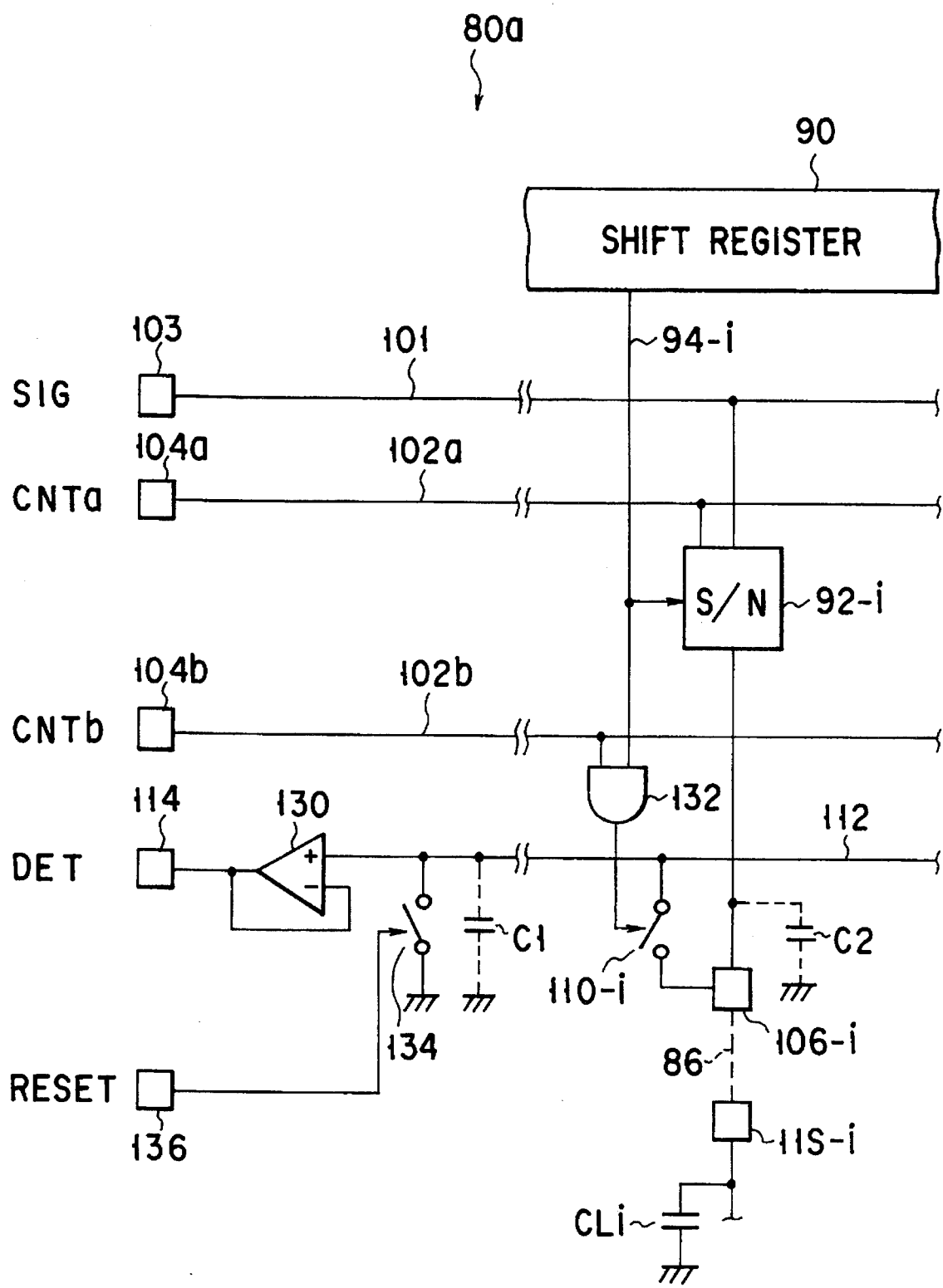
FIG. 14 is a circuit diagram showing an LCD drive system in accordance with a still further embodiment of the invention.

An LCD system 80a shown in FIG. 14 is similar to that of FIG. 10 with (1) the control terminal 104 being replaced with first and second control terminals 104a, 104b, (2) an operational amplifier 130 being added as a buffer to the check terminal 114, and (3) an AND gate circuit 132 being connected to each of the selector switches 110. The first and second control terminals 104a, 104b externally receive first and second control signals CNTa, CNTb. Terminals 104a, 104b are coupled to signal lines 102a, 102b, respectively. The control signal CNTa is supplied to terminal 104a, for selectively controlling the supply of the outputs of S/H circuits 92 in such a manner as to cause the S/H outputs to be transferred to the output terminals 106, or to be set in an electrically floating state. The control signal CNTb is supplied to terminal 104b, for forcing the selector switches 110 (only one of which is shown in FIG. 14 for purposes of illustration only) to selectively turn on or off in response to a logical sum of control signal CNTb and shift-register outputs.

The buffer amplifier 130 has an inverting input being coupled to its output, a non-inverting input coupled to the common line 112 for selector switches 106, only one of which is shown in FIG. 14 for purposes of illustration only. The output of amplifier 130 is coupled to check terminal 114. A switch device 134 is connected between line 112 and the ground potential. Switch 132 has a control input being coupled to a reset terminal 136. Switch 134 turns on selectively in response to a reset signal RESET externally supplied to terminal 136, causing line 112 to be reset in potential. A capacitor C1 is shown in FIG. 14 to represent the stray capacitance at signal line 112.

The AND gate 132 has a first input coupled to a corresponding one of the outputs of the shift register 90 by way of signal line 94-i, a second input coupled to the second control signal line 102b, and an output coupled to the control input of a corresponding one (110-i) of the selector switches 110. A capacitor C2 is shown in FIG. 14 to represent the inherent stray capacitance on a signal line connecting S/N circuit 92-i with an output terminal 106-i.

Figure 15:
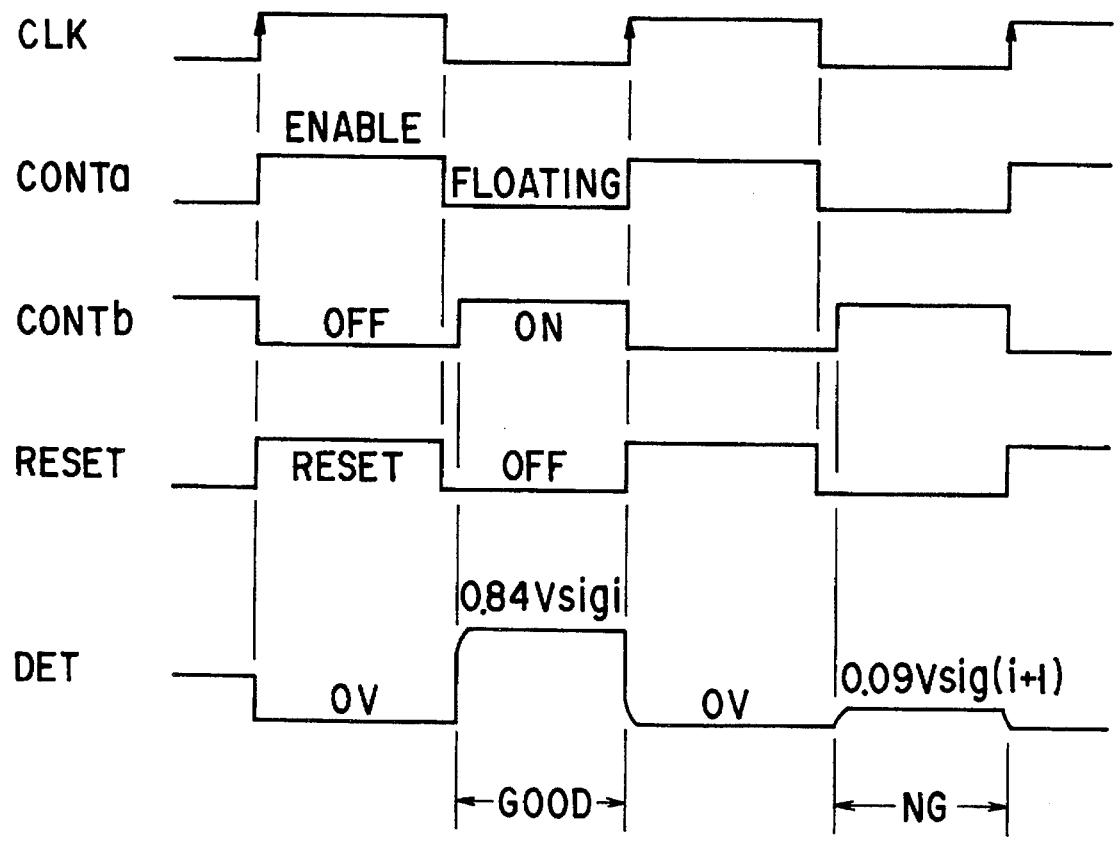
FIG. 15 is a timing diagram showing the pulse sequence for the operation of the embodiment of FIG. 14.

The operation of the circuit 80a will be described with reference to the timing diagram of FIG. 15. The first control terminal 104a of FIG. 14 is potentially controlled to transmit the output signals of the S/H circuits 92 to the output terminals 106, thus charging the wiring capacitor (CL) as a load to a predetermined voltage. At this time, the switch selector circuits 110 are maintained in the OFF state by the control signal CNTb supplied to the second control terminal 104b. First control terminal 104a is then controlled so that the outputs from S/H circuits 92 are set in an electrically floating state. Thereafter, second control terminal 104b is controlled to cause the switch selector circuit 110 (110i in this case) to turn on. With such operation, the charge in the wiring capacitor (CLi in this case) is distributed to the capacitor of the common line 112, and its potential is output to the check terminal 114 through the buffer 130. Subsequently, the reset switch 134 is turned on to discharge the charge capacitively stored in the common wire 112, thus resetting common wire 112 in the initial state, and waiting for the charge from the next (i+1)th circuit. A voltage Vdet-i detected at this time can be given by:

$$V_{det-i} = V_{sig-i} \cdot (C2 + CLi)/(C1 + CLi + C2)$$

where "Vsig-i" is the input voltage corresponding to the i-th display image signal (Sig).

The principle of the inspecting/determining electrical connection condition will now be described on the basis of respective typical values. Assume that C2, C1, CLi are 1 pF, 10 pF, 50 pF, respectively. If an output terminal 5i of the integrated circuit section and a data line terminal 115-i of the matrix substrate section are properly connected to each other, Vdet-i= 0.84·Vsig-i. If the terminals are not properly connected to each other, CLi is equivalent to 0 pF, and Vdet-i= 0.09·Vsig-i. Since the value of Vsig-i is on the order of several volts, the both values are sufficiently larger than a circuit noise and hence can be easily discriminated, thereby attaining an accurate discrimination of an imperfect connection state.

Since voltage variations reflecting the electrical connection states between the output terminals of an IC device and the address lines or the data lines formed on a matrix substrate and serving as the loads of the output terminals can be properly monitored through a check terminal as described previously, it also becomes possible to detect whether each output terminal is properly connected to a corresponding line. Note that this circuit arrangement can also be applied to the above-described inspection of a separate integrated circuit element.

The the above embodiment is mainly directed to the data line driver integrated circuit of the LCD. However, the present invention can be applied to an address (gate) line driver integrated circuit. In addition, if various patterns are used as the signal patterns of display image signals (Sig), and a normal/defective state is comprehensively determined on the basis of the results obtained using the various signal patterns, accurate determination can be performed. Moreover, a defective mode can be determined. This embodiment can be applied to a simple matrix type LCD as well as an active matrix type LCD.

An embodiment shown in FIG. 6 is an LCD device employing such integrated circuit device, wherein an LCD panel 140 is driven by data line drive integrated circuits 142-1, 142-2, . . . , 142-m, and a plurality of known address line drive integrated circuits (not shown). The ICs 142 incorporate switch arrays for selectively extracting drive output signals to check terminals, as in the embodiment of FIG. 10 or 14. Signals DET derived from the check terminals of ICs 142 are converted into digital data by an analog-to-digital converter 144, and are stored as correction data in a digital memory 146, which may be a dynamic random-access memory (DRAM). An image corrector 148 is provided to correct a display image signal SigO, supplied from an external system, on the basis of the correction data. The corrected signal is then supplied as a display image signal SIG to the data line drive ICs 142, thus driving the LCD panel 140 by using a drive signal based on the input display image signal SIG.

The characteristic features of the embodiment over the prior art will be described. FIG. 17 is a graph showing the general input/output characteristics of a data drive IC. A voltage Vsig of an input display image signal ideally coincides with a voltage vout of an output signal applied to a data line. It should be required that the input/output characteristics of all the output terminals be as nearly uniform as possible. Actually, however, as is apparent from curves OUT1, OUT2 in FIG. 17, there are the offset variations and gain variations of the internal amplifiers, so that the voltages applied to the data lines of the LCD panel section may spatially vary between the terminals, as shown in FIG. 18. The voltage variation ranges from 40 mV to 100 mVp-p depending on the arrangement, and is visually recognized as vertical line noise, thus interfering with an improvement in display quality. This voltage variation can be theoretically reduced by improving the transistor characteristics of the first stage of each amplifier in the integrated circuit or improving the characteristics of each sample/hold circuit. In practice, however, a great improvement in characteristics cannot be achieved, considering many sacrifices that must be made in terms of circuit size, power consumption, chip area, operation speed, cost, and the like.

With the arrangement of the embodiment, display image signals of various test patterns are supplied to the image corrector in advance, and corresponding output signals are sequentially selected and read from the check terminals so as to be stored, as correction data, in the memory element, thereby correcting the input/output characteristics of the ICs and their variations. As a result, the variations in voltages applied to the data lines of the LCD panel can be greatly reduced to improve the display performance to such an extent that vertical line noise on the display cannot be visually recognized at all.

More specifically, by performing A/D conversion and correction processing in 8 bits, the voltage variation was improved to less than 10 mVp-p. In this case, the correction processing was performed to correct variations in offset voltage and gain, in which processing subtraction (for offset voltage) and division (for gain) were performed on the basis of the correction data. As the image corrector 148, a generally used arithmetic circuit using an operational amplifier, a D/A converter, and the like can be satisfactorily used. Although an ordinary RAM was used as the memory element, a memory having a small capacity of 31 kilobits ((8 bits 8 bits)×1920) is sufficient for a general number of data lines, i.e., 1920 (640 pixels×three colors (R, G, B)).

Various modifications of the above-described correction data and correction processing method may be made depending on characteristics to be corrected. For example, in addition to offset voltage and gain, the linearity of input/output characteristics can be corrected by a method similar to that described above. In addition, higher display quality can be obtained by storing the nonlinear input/output data (as known data) of each active element in an LCD panel together with linearity correction data. Furthermore, a deterioration in display resolution, caused when the voltage level difference between adjacent outputs to data lines is smaller than an input display image signal depending on the frequency band characteristics of each IC internal circuit, can be prevented in the following manner. A test pattern corresponding to the waveform of such an input signal is input to a check terminal. A signal from the check terminal is then stored as correction data. Correction processing is then performed on the basis of the correction data to emphasize the level difference between the adjacent outputs, thereby displaying a sharp, high-quality image.

The input/output characteristics of an IC may change with temperature or time; however, constant display performance can be ensured, even with such changes with temperature or time, by properly updating the correction data using a signal from a check terminal. If such changes with temperature or time can be ignored, the A/D converter 144 in FIG. 16 can be separated from the LCD set to achieve a reduction in cost. That is, an A/D converter is arranged in an adjustment unit at the time of shipment from the factory, and a PROM is used as a memory element 101 to store correction data therein.

The present invention is not limited to the above-described specific embodiments and may be practiced or embodied in still other ways without departing from the spirit or essential character thereof. Although the embodiments of the present invention has been described with respect to the LCD devices, the invention can alternatively be applied to other types of electronic devices having similar arrangements, such as a communication exchange hybrid module, the head mechanism of a printer, an image read sensor, and so forth.

What is claimed is:

1. An integrated circuit device comprising:

a substrate an electronic circuitry mounted on said substrate, including a liquid crystal display device, a driver circuit which drives said liquid crystal display device, and output terminals;

a logic circuit arranged on said substrate, for generating output signals which are smaller in number than input signals which are supplied by the output terminals of said electronic circuitry; and check terminals coupled to the output signals of said logic circuit, being fewer in number than the output terminals of said electronic circuitry, and being adapted to be externally coupled to an electronic inspection tool.

2. The device according to claim 1, wherein said means comprises:

selector means for allowing said potentials at said signal carrying terminals to be sequentially supplied to one of said extra terminals.

3. The device according to claim 1, wherein said selector means includes:

an array of switch devices having first nodes coupled to said signal carrying terminals respectively, and second nodes coupled together to the one extra terminal; and switch controller means coupled to said switch devices, for forcing said switch devices to turn on in a preselected order in such a manner that a presently selected switch device turns on while the remaining ones of said switch device turn off.

4. The device according to claim 1, wherein said substrate includes a semiconductive chip substrate.

5. The device according to claim 1, wherein said substrate includes a semiconductive wafer on which a plurality of chip substrates are formed.

6. The device according to claim 1, wherein said driver circuit of said electronic circuitry includes a matrix circuit.

7. An electronic equipment comprising:

a function circuit having signal inputs and signal outputs;

a load circuit electrically driven by said function circuit, said load circuit having signal outputs;

wire means for electrically connecting the outputs of said load circuit to the outputs of said function circuit, respectively, to thereby allow signal transmission between said function circuit and said load circuit;

inspection means coupled to said function circuit, for processing potentials at the outputs of said function circuits to produce one or a preselected number of monitoring signals which are less in number than said outputs of said function circuits, said inspection means including:

an array of switch devices having first nodes coupled to said outputs of said function circuits, and second nodes coupled to one of said check terminals; and shift register means coupled to said switch devices, for controlling said switch devices to turn on sequentially; and substrate means for supporting thereon said function circuit, said inspection means and said check terminals.

8. The equipment according to claim 7, further comprising:

one or a plurality of check terminals to which said monitoring signals are supplied.

9. The equipment according to claim 8, wherein said inspection means includes a logic circuit.

10. The equipment according to claim 6, wherein said substrate means includes a semiconductive substrate.

11. An integrated circuit device comprising;

a substrate;

an electronic circuitry mounted on said substrate, having a liquid crystal display device, a driver circuit which drives said liquid crystal display device, and output terminals;

check terminals being fewer in number than the output terminals of said electronic circuitry, and being adapted to be externally coupled to an electronic inspection tool;

an array of switch devices having first nodes coupled to the output terminals of said electronic circuitry, and second nodes coupled together to said check terminals; and switch controller coupled to said switch devices to turn on in a preselected order in such a manner that a presently selected switch device turns on while the remaining ones of said switch device turn off.

12. The device according to claim 11, wherein said substrate includes a semiconductive chip substrate.

13. The device according to claim 11, wherein said substrate includes a semiconductive wafer on which a plurality of chip substrates are formed.

14. The device according to claim 11, wherein said driver circuit of said electronic circuitry includes a matrix circuit.

15. An integrated circuit device adapted to be externally coupled to an electronic circuitry which has a liquid crystal display device, a driver circuit which drives said liquid crystal device and output terminals; said device comprising:

check terminals arranged on said substrate, and being fewer in number than the output terminals of said electronic circuitry, and being adapted to be externally coupled to an electronic inspection tool;

an array of switch devices arranged on said substrate, and having first nodes coupled to the output terminals of said electronic circuitry, and second nodes coupled together to said check terminals; and switch controller arranged on said substrate, said switch controller coupled to said switch devices to turn on in a preselected order in such a manner that a presently selected switch device turns on while the remaining ones of said switch device turn off.

* * * * *